United States Patent [19]

Hassenrück et al.

[11] Patent Number: 5,607,502
[45] Date of Patent: Mar. 4, 1997

[54] DYESTUFFS FOR PRINTING INKS

[75] Inventors: Karin Hassenrück, Düsseldorf; Peter Wild, Odenthal; Martin Michna, Pulheim, all of Germany

[73] Assignee: Bayer Aktiengesellschaft, Leverkusen, Germany

[21] Appl. No.: 547,697

[22] Filed: Oct. 19, 1995

[30] Foreign Application Priority Data

Oct. 26, 1994 [DE] Germany ............... 44 38 177.8

[51] Int. Cl.$^6$ ...................... C09D 11/02
[52] U.S. Cl. ............. 106/22 K; 106/20 D; 8/682; 8/683; 8/696; 8/919; 534/682
[58] Field of Search .............. 8/682, 683, 696, 8/402, 919; 534/682; 106/22 K, 20 D

[56] References Cited

U.S. PATENT DOCUMENTS

| 2,785,158 | 3/1957 | Enders et al. |
| 4,761,180 | 8/1988 | Askeland et al. |
| 5,476,541 | 12/1995 | Tochihara ............... 106/22 K |

FOREIGN PATENT DOCUMENTS

| 0583133 | 2/1994 | European Pat. Off. |
| 2043821 | 3/1972 | Germany. |

OTHER PUBLICATIONS

Chemical Abstracts, vol. 77, abstract No. 50021t, abstract of DE 2 043 821, (1972).

*Primary Examiner*—Margaret Einsmann
*Attorney, Agent, or Firm*—Sprung Horn Kramer & Woods

[57] ABSTRACT

A process has been found for dyeing and printing pater, wood, plastic or metal, in which dyestuffs which, in the form of the free acid, correspond to the formula (I)

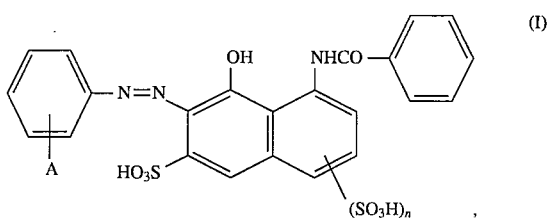

wherein

A denotes a phenol radical which is optionally substituted by alkyl or cycloalkyl and n represents 0 or 1, are employed.

10 Claims, No Drawings

DYESTUFFS FOR PRINTING INKS

The invention relates to a process for printing paper, wood, plastic or metal with special azo dyestuffs, and to a process for printing these materials with printing inks which comprise special azo dyestuffs, and to a process for pulp-dyeing of paper using special azo dyestuffs.

The invention thus relates to a process for printing paper, wood, plastic or metal with at least one dyestuff which, in the form of the free acid, corresponds to the formula (I)

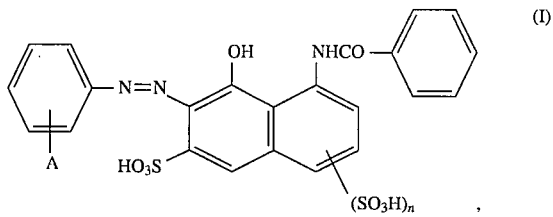

wherein

A denotes a radical, in the ortho-, meta- or para-position relative to the azo group, of the formula

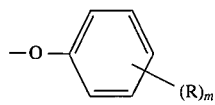

in which

R independently of one another represents $C_1$-$C_5$-alkyl which is unsubstituted or substituted by hydroxyl, amino, carboxyl or sulpho groups, or $C_5$-$C_8$-cycloalkyl, n represents 0 or 1 and m denotes 0 to 5, preferably 1 to 3, in particular 1.

R can assume the following meanings by way of example: methyl, ethyl, n-propyl, isopropyl, n-butyl, sec-butyl, tert-butyl, pentyl, hydroxyethyl, hydroxypropyl, aminoethyl, aminopropyl, cyclopentyl and, in particular, cyclohexyl.

In a preferred embodiment of the process according to the invention, those dyestuffs of the formula (I) wherein the radical A is in the ortho-position relative to the azo group and n denotes 1 are employed. Those dyestuffs of the formula (I) wherein m is additionally 1 and the radical R is in the ortho- or para-position relative to the oxygen atom are particularly preferably employed here. The dyestuffs of the formula (I) which correspond to the formula (II)

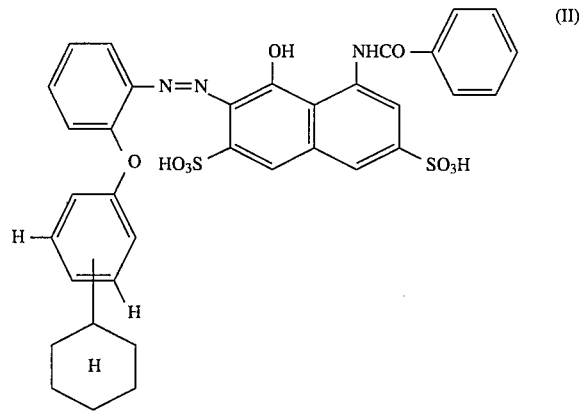

are especially preferred here.

In the two dyestuffs represented by the formula (II), the cyclohexyl group is bonded in the ortho-position relative to the oxygen atom in one case (IIa) and in the para-position in one case (IIb). Preferably, these two isomers are present as a mixture of 80 to 90% of (IIa) and 10 to 20% of (IIb).

The dyestuffs of the formulae (I) and (II) can be in the form of free acids or in the form of salts, preferably as alkali metal salts, such as sodium, potassium or lithium salts, or as ammonium or optionally substituted alkylammonium salts.

The dyestuffs of the formula (I) are known as dyestuffs for wool, for example, from U.S. Pat. No. 2,785,158 and DE-A 2 043 821, and can be prepared in a known manner. Dyestuffs of the formula (I) have already been employed in EP 583 133 for printing textiles.

The material to be printed by the process according to the invention is preferably printed with printing inks.

To prepare these printing inks, at least one dyestuff of the formula (I) is dissolved in water and/or one or more organic solvents, if appropriate with the addition of organic and/or inorganic acids or organic and/or inorganic bases. A dyestuff of the formula (I) which has been purified, desalinated and if appropriate concentrated beforehand by application of membrane processes, such as, for example, ultrafiltration, microfiltration, reverse osmosis or a combination thereof, is preferably used for the preparation of these printing inks. The solutions or suspensions obtained in the membrane processes mentioned can be employed directly for the preparation of the printing inks. However, it is also possible to convert the solutions or suspensions into solid formulations beforehand, for example by spray drying.

It is also possible for the synthesis solution or suspension obtained during synthesis of the dyestuff to be converted into the printing inks without intermediate isolation of the dyestuff, if appropriate with the addition of inorganic and/or organic bases or inorganic and/or organic acids and if appropriate with the addition of one or more organic solvents and water.

The synthesis solution or suspension is preferably purified and desalinated beforehand by application of membrane processes, such as, for example, ultrafiltration, microfiltration and reverse osmosis or a combination thereof.

These printing inks preferably comprise 0.1 to 20% by weight, in particular 0.5 to 15% by weight, and especially preferably 0.5 to 10% by weight, of a dyestuff of the formula (I), dissolved in water and/or one or more organic solvents. The pH of the printing inks can be between pH 3 and 9. The printing inks preferably have a pH of 4 to 8.

Customary organic and/or inorganic acids, such as, for example, hydrochloric acid, lactic acid, p-toluenesulphonic acid, acetic acid or citric acid, or organic and/or inorganic bases, such as alkali metal hydroxides or amines, such as methyldiethanolamine, diethanolamine, triethanolamine or polyglycolamines, such as, for example, the reaction product of ammonia with 6 mol of ethylene oxide, can be employed to establish the pH. The printing inks may, furthermore, comprise customary buffers such as, for example, acetates, citrates or phosphonates, in the amounts customary for this purpose.

The printing inks according to the invention furthermore can comprise customary additives such as, for example, surfactants, fungicides, bactericides or binders such as, for example, acrylate binders, in the amounts customary for these additives.

The printing inks in general comprise up to 50% by weight of organic solvents, but preferably less than 30% by weight. Printing inks which comprise 2 to 30% by weight of organic solvents are particularly preferred here.

Possible organic solvents are, in particular, water-soluble organic solvents, such as, for example, $C_1$-$C_4$-alkanols, such as methanol, ethanol, n-propanol, isopropanol, n-butanol, sec-butanol, tert-butanol and isobutanol; pentanediols; hexanetriols; amides, such as formamides and dimethylacetamide; ketones or ketone alcohols, such as acetone and diacetone alcohols; esters, such as tetrahydrofuran and dioxane; nitrogen-containing heterocyclic compounds, such as 2-pyrrolidone, N-methyl-pyrrolid-2-one and 1,3-dimethylimidazolid-2-one; polyalkylene glycols, such as polyethylene glycol and polypropylene glycol; alkylene glycol and thioglycols with $C_2$-$C_6$-alkylene units, such as ethylene glycol, propylene glycol, butylene glycol, triethylene glycol, thiodiglycol, hexylene glycol and diethylene glycol; other polyols, such as glycerol and 1,2,6-hexanetriol; and alkyl ethers and polyalkyl ethers of alcohols, such as 2-methoxyethanol, 2-(2-methoxy-ethoxy)ethanol, 2-(2-ethoxyethoxy)ethanol, 2-methoxy-2-ethoxy-2-ethoxyethanol, 2-[2-(2-methoxyethoxy)ethoxy]ethanol and 2-[2-(2-ethoxyethoxy)ethoxy]ethanol.

Preferred water-soluble organic solvents are glycols and glycol ethers, such as ethylene glycol, diethylene glycol, triethylene glycol and 2-methoxy-2-ethoxy-2-ethoxyethanol; polyethylene glycol having a molecular weight of up to 500; heterocyclic ketones, such as 2-pyrrolidone, N-methylpyrrolid-2-one and 1,3-dimethylimidazolid-2-one; and 1,5-pentanediol. Preferred solvent mixtures are binary mixtures of water and diethylene glycol, water and 2-pyrrolidone, and water and 1,5-pentanediol, and ternary mixtures of water, diethylene glycol and N-methylpyrrolid-2-one.

In addition to the dyestuffs of the formula (I), the printing inks can also additionally comprise one or more dyestuffs customary for printing inks, such as, for example, the dyestuffs listed in the Colour Index, in particular Acid Red 52, which can be used, for example, for shading.

The printing inks preferably to be employed in the process according to the invention are preferably used as a recording liquid for inkjet recording systems. The inkjet recording systems are, for example, inkjet printers, such as thermal jet, bubble jet, piezo-inkjet or valve inkjet. The preferred recording material for inkjet printers is paper.

The inkjet recording process is known per se. In this process, droplets of a writing liquid are shot from one or more small jets in a controlled manner onto a carrier material. The individual droplets are combined into written symbols or graphic patterns by electronic control. It is necessary here for the ink to interact with the carrier material, preferably paper. The ink should penetrate into the paper without spreading too much, since otherwise the print quality suffers. The printed information must dry quickly, and be water-resistant and fast to wiping. Many inks have some of the properties required at the expense of the other properties. The water resistance of the dyestuffs in particular is usually unsatisfactory.

Surprisingly, it has been found that the dyestuffs of the formula (I) employed in the process according to the invention give prints which are particularly water-resistant and fast to wiping when used as printing inks in inkjet recording systems. The printing inks according to the invention result in good water-fastnesses on a large number of different papers. Their suitability for a large number of non-coated papers, so-called plain papers, is particularly important. The widely used largely neutral writing papers, which are becoming increasingly widespread, may be mentioned in particular here.

Printing films of plastic with ink recording processes using the printing inks according to the invention is equally preferred. The films of plastic preferably employed here are transparent polyethylene films.

The invention furthermore relates to a process for pulp-dyeing of paper, characterized in that a dyestuff of the formula (I) is used.

The following Examples are intended to illustrate the invention, but without limiting it.

Percentages and parts in each case relate to the weight, unless stated otherwise.

1. PREPARATION OF THE PRINTING INKS 1000 kg of a solution of 50 kg of dyestuff of the formula (II) (IIa/IIb about 88/12) in water having a dry matter content of 6.5% and a Chloride content of 0.8% are subjected to ultrafiltration in a commercially available pressure permeation unit. 1000 kg of permeate are initially removed and continuously replaced by 1000 kg of demineralized water. The solution is then concentrated to 600 kg of solution by removing 400 kg of permeate. This solution is desalinated further by removal of 600 kg of permeate and continuous replacement by demineralized water. Thereafter, the solution is concentrated by removal of permeate until the flow has fallen to less than 200 $l \times m^{-2} \times d^{-1}$. The concentrate which remains is spray dried and can be processed, by renewed dissolving in water and/or one or more organic solvents, to give a printing ink which is outstandingly suitable for the inkjet printing process.

2. DETERMINATION OF THE FASTNESS TO WATER

General Instructions for the Experiments

The printing inks of Examples 1 to 6 were prepared by dissolving the stated dyestuffs in the solvents mentioned.

The dyestuff solutions were then each forced through a 0.2 μm (0.0002 mm) filter and introduced into clean cartridges type 51608A from Hewlett Packard for the Deskjet 500®. Agfa copying paper type 701® was printed over the entire surface on the Deskjet 500®.

The comparison ink of Example 7 comprises the magenta dyestuff customary for an inkjet printer. The comparison ink of Example 7 is a ready-to-use commercial product which is employed directly without filtration.

The prints were stored in the room atmosphere for 24 hours and then stored in completely desalinated water for 24 hours. The paper was then removed from the water-bath and dried. The depth of colour on the original print with the staining of the paper which remained after storage under water was evaluated (rating scale 1–5: 5 very good).

EXAMPLE 1

Printing Ink 90 parts of completely desalinated water, 10 parts of diethylene glycol and 1.5 parts of the dyestuff of the formula (II)

EXAMPLE 2

Printing Ink 92 parts of completely desalinated water, 8 parts of 1,5-pentanediol and 1.5 parts of the dyestuff of the formula (II)

EXAMPLE 3

Printing Ink 93 parts of completely desalinated water, 7 parts of 2-pyrrolidone, 1.5 parts of the dyestuff of the formula (II)

EXAMPLE 4

Printing Ink 90 parts of completely desalinated water, 10 parts of diethylene glycol, 0.75 part of the dyestuff of the formula (II) and 0.75 part of Acid Red 52

EXAMPLE 5

Printing Ink 92 parts of completely desalinated water, 8 parts of 1,5-pentanediol, 0.75 part of the dyestuff of the formula (II) and 0.25 part of Acid Yellow 52

EXAMPLE 6

Printing Ink 90 parts of completely desalinated water, 10 parts of diethylene glycol and 0.75 part of Acid Red 52 and 0.25 part of dyestuff (II)

EXAMPLE 7

The commercially available comparison ink comprises 1% by weight of the dyestuff Acid Red 52, 9% by weight of 1,5-pentanediol and 90% by weight of completely desalinated water.

The printing inks of Examples 1–6 are employed according to the invention in inkjet printing the dyestuffs of the printing inks employed according to the invention showing advantages over the comparison print.

The results of the determination of the water-fastness for Examples 1 to 7 are summarized in the following Table.

| Example | Water-fastness |
| --- | --- |
| 1 | 3 |
| 2 | 3 |
| 3 | 3 |
| 4 | 2 |
| 5 | 2 |
| 6 | 2 |
| 7 | 1 |

We claim:
1. An inkjet recording process for printing paper wherein a dyestuff which, in the form of the free acid, corresponds to the formula (I)

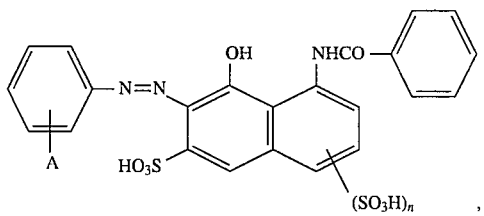

wherein

A denotes a radical, in the ortho-, meta- or para-position relative to the azo group of the formula

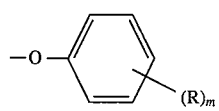

wherein

R independently of one another represents $C_1$-$C_5$-alkyl which is unsubstituted or substituted by hydroxyl, amino, carboxyl or sulpho groups, or $C_5$-$C_8$-cycloalkyl, n represents 0 or 1 and m denotes 0 to 5 is ejected onto said paper in a controlled manner from an inkjet printer to form written symbols or graphic patterns.

2. Process according to claim 1, wherein a dyestuff of the formula (I) wherein R denotes methyl, ethyl, n-propyl, isopropyl, n-butyl, sec-butyl, tert-butyl, pentyl or hydroxyethyl is employed.

3. Process according to claim 1, wherein a dyestuff of the formula (I) wherein the radical A is in the ortho-position relative to the azo group and m denotes 1 is employed.

4. Process according to claim 1, wherein the radical R is in the ortho- or para-position relative to the oxygen atom.

5. Process according to claim 1, wherein a dyestuff of the formula (I) which correspond to the formula (II)

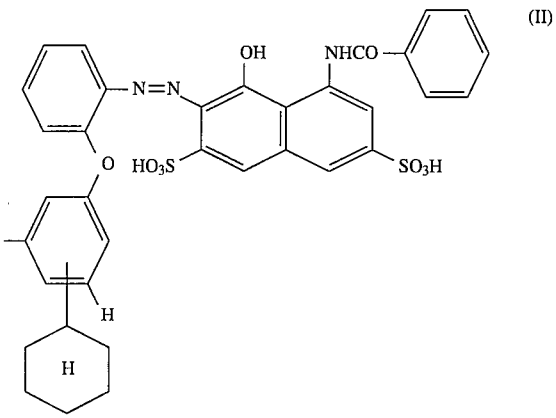

is used.

6. Process according to claim 1, wherein a dyestuff of the formula (I) is used, wherein m denotes 1 to 3.

7. Process according to claim 1, wherein a dyestuff of the formula (I) is used, wherein m denotes 1.

8. Process for printing paper with a recording liquid comprising the dyestuff according to claim 1.

9. Paper which has been printed by the process of claim 1.

10. In a process for pulp-dyeing of paper with a dyestuff, the improvement wherein said dyestuff, in the form of the free acid, corresponds to the formula (I)

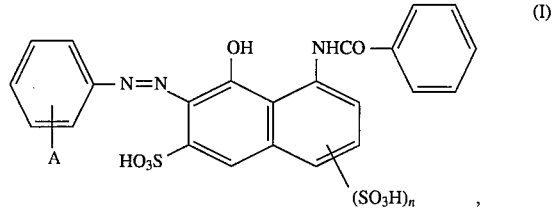

wherein

A denotes a radical, in the ortho-, meta- or para-position relative to the azo group of the formula

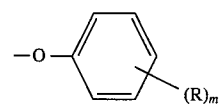

wherein

R independently of one another represents $C_1$-$C_5$-alkyl which is unsubstituted or substituted by hydroxyl, amino, carboxyl or sulpho groups, or $C_5$-$C_8$-cycloalkyl, n represents 0 or 1 and m denotes 0 to 5.

* * * * *